United States Patent [19]

Tsai

[11] Patent Number: 5,552,762
[45] Date of Patent: Sep. 3, 1996

[54] WARNING DEVICE FOR LOGICALLY CONTROLLING HEADLIGHTS OF A MOTOR VEHICLE

[76] Inventor: Ching Y. Tsai, P.O. Box 82-144, Taipei, Taiwan

[21] Appl. No.: 282,650

[22] Filed: Jul. 29, 1994

[51] Int. Cl.$^6$ ............................... B60Q 1/26; B60Q 1/02
[52] U.S. Cl. ..................... 340/468; 340/469; 340/457.2; 340/474; 340/326; 315/82; 315/83; 307/10.8
[58] Field of Search .................................. 340/468, 469, 340/457.2, 474, 326; 315/82, 83; 307/10.8

[56] References Cited

U.S. PATENT DOCUMENTS 3,891,986 6/1975 Lipe et al. ............................ 340/474
4,692,736 9/1987 Crisci ..................................... 340/471
5,001,398 3/1991 Dunn ...................................... 340/469

Primary Examiner—Donnie L. Crosland
Attorney, Agent, or Firm—Alfred Lei

[57] ABSTRACT

A warning device for logically controlling headlights of a motor vehicle comprising a photocoupler which picks up signal voltage from a horn and triggers an astable multivibrator via a gate-controlled circuit to output a signal voltage in a predetermined time to a monostable multivibrator which outputs a continuous time-sequencing pulses to the encoding input terminal of a decoder via the gate-controlled circuit thereby causing the decoder to produce sequential output, the sequential output being divided by a multi-input gate-controlled circuit into two output voltages which are amplified by transistors to drive two relays connected with high beam and low beam thus making the high beam and low beam to give light alternately.

5 Claims, 3 Drawing Sheets

| INPUT | | | | | OUTPUT | |
|---|---|---|---|---|---|---|
| L1 | G1 | W1 | P | N | HIBEAM | LOBEAM |
| 1 | 0 | 0 | 0 | 0 | ⎾‾‾ | 0 |
| 0 | 0 | 1 | 0 | 0 | 0 | ⎾‾‾ |
| 1 | 0 | 0 | ⎍ | 0 | ⎾⎁‾ | ⎍ |
| 0 | 0 | 1 | ⎾ | 0 | ⎍⎍⎍⎍ | ⎍⎍⎍ |
| 1 | 0 | 0 | ⎾ | 0 | ⎍⎍⎍ | ⎍⎍⎍ |
| 0 | 0 | 1 | ⎍ | 0 | ⎍ | ⎁ |
| 0 | 0 | 0 | ⎍ | 0 | ⎍ | ⎍ |
| 0 | 0 | 0 | ⎾ | 0 | ⎍⎍⎍⎍ | ⎍⎍⎍ |
| 1 | 0 | 1 | 0 | 0 | ⎾‾‾ | 0 |
| 0 | 0 | 0 | 0 | 0 | 0 | 0 |
| 0 | 1 | 1 | 0 | 0 | ⎾‾‾ | 0 |
| 1 | 1 | 0 | 0 | 0 | 0 | ⎾‾‾ |
| 1 | 1 | 0 | ⎍ | 0 | ⎁ | ⎁ |
| 0 | 1 | 1 | ⎍ | 0 | ⎁ | ⎍ |
| 1 | 1 | 0 | ⎾ | 0 | ⎍⎍⎍ | ⎍⎍⎍ |
| 0 | 1 | 1 | ⎾ | 0 | ⎍⎍⎍ | ⎍⎍⎍ |

FIG. 3

WARNING DEVICE FOR LOGICALLY CONTROLLING HEADLIGHTS OF A MOTOR VEHICLE

BACKGROUND OF THE INVENTION

It has been found that motor vehicles have already become inevitable in our daily life and utilize horns to make warning sound. However, in case the windows of an automobile are all closed, the warning sound may not be perceived clearly by the driver thereby often causing accidents.

Therefore, it is an object of the present invention to provide a warning device which can make the high beam and low beam to give light alternately when the horn is pressed thus obviating and mitigating the above-mentioned drawback.

SUMMARY OF THE INVENTION

This invention relates to a warning device for logic controlling headlight of a motor vehicle.

It is the primary object of the present invention to provide a warning device for logic controlling headlight of a motor vehicle which will make the high beam and low beam to give light alternately when the horn is pressed.

It is another object of the present invention to provide a warning device for logic controlling headlight of a motor vehicle which can further ensure the safety of the driver.

It is still another object of the present invention to provide a warning device for logic controlling headlight of a motor vehicle which can be adapted to various kinds of motor vehicles.

It is still another object of the present invention to provide a warning device for logic controlling headlight for a motor vehicle which is simple in construction.

It is a further object of the present invention to provide a warning device for logic controlling headlight for a motor vehicle which is low in cost.

The other objects and merits and a fuller understanding of the present invention will be obtained by those having ordinary skill in the art when the following detailed description is read in conjunction with the accompanying drawings wherein like numerals refer to like or similar part.

BRIEF DESCRIPTION OF THE DRAWINGS

FIG. 3 shows the working principle of the present invention.

DETAILED DESCRIPTION OF THE PREFERRED EMBODIMENT

Figure 1:
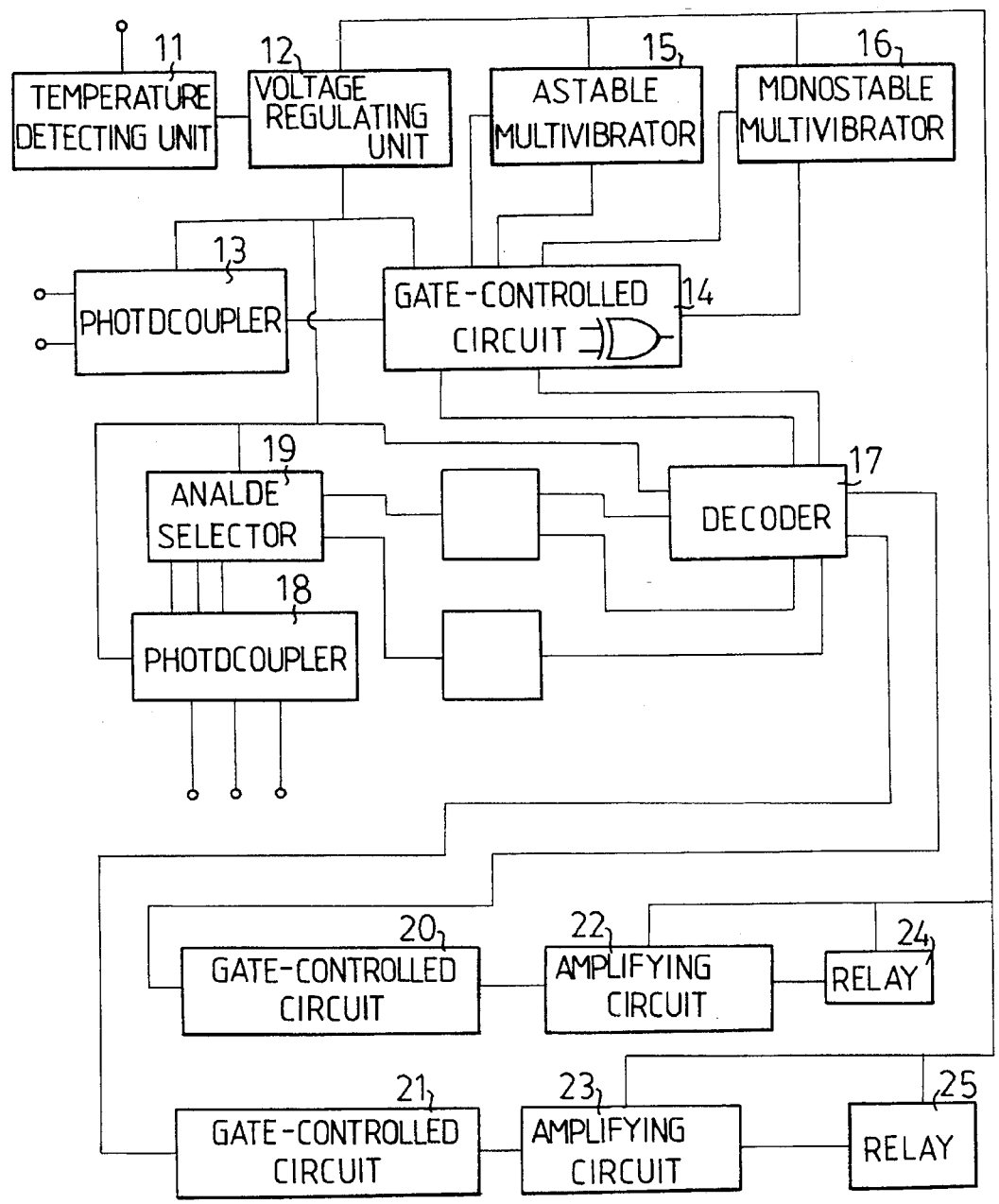
FIG. 1 is a block diagram of the present invention.

For the purpose of promoting an understanding of the principles of the invention, reference will now be made to embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIG. 1 thereof, the warning device for logic controlling headlight of a motor vehicle according to the present invention comprises a temperature detecting unit 11 to prevent short circuit of the power supply. A voltage regulating unit 12 is provided to keep the working voltage at a predetermined value. A photocoupler 13 is used for picking up signal voltage from a horn connecting line. When the horn is pressed, the photocoupler 13 will trigger an astable multivibrator 15 via a gate-controlled circuit 14 to output a signal voltage in a predetermined time to a monostable multivibrator 16 which outputs a continuous time sequencing pulses to the encoding input terminal of a decoder 17 via the gate-controlled circuit 14.

The voltage input terminal of the headlight are connected to a photocoupler 18 and suitably selected by a analog selector 19 so as to adapt to different connecting voltages of various motor vehicles. Then, the selected voltage signal is input into the decoder 17 to make it produce sequential output which is divided into two output voltages which are converted by gate-controlled circuits 20 and 21 which are then amplified by amplifying circuits 22 and 23 to drive two relays 24 and 25 connected with high beam and low beam thus making the high beam and the low beam to give light alternately.

Figure 2:
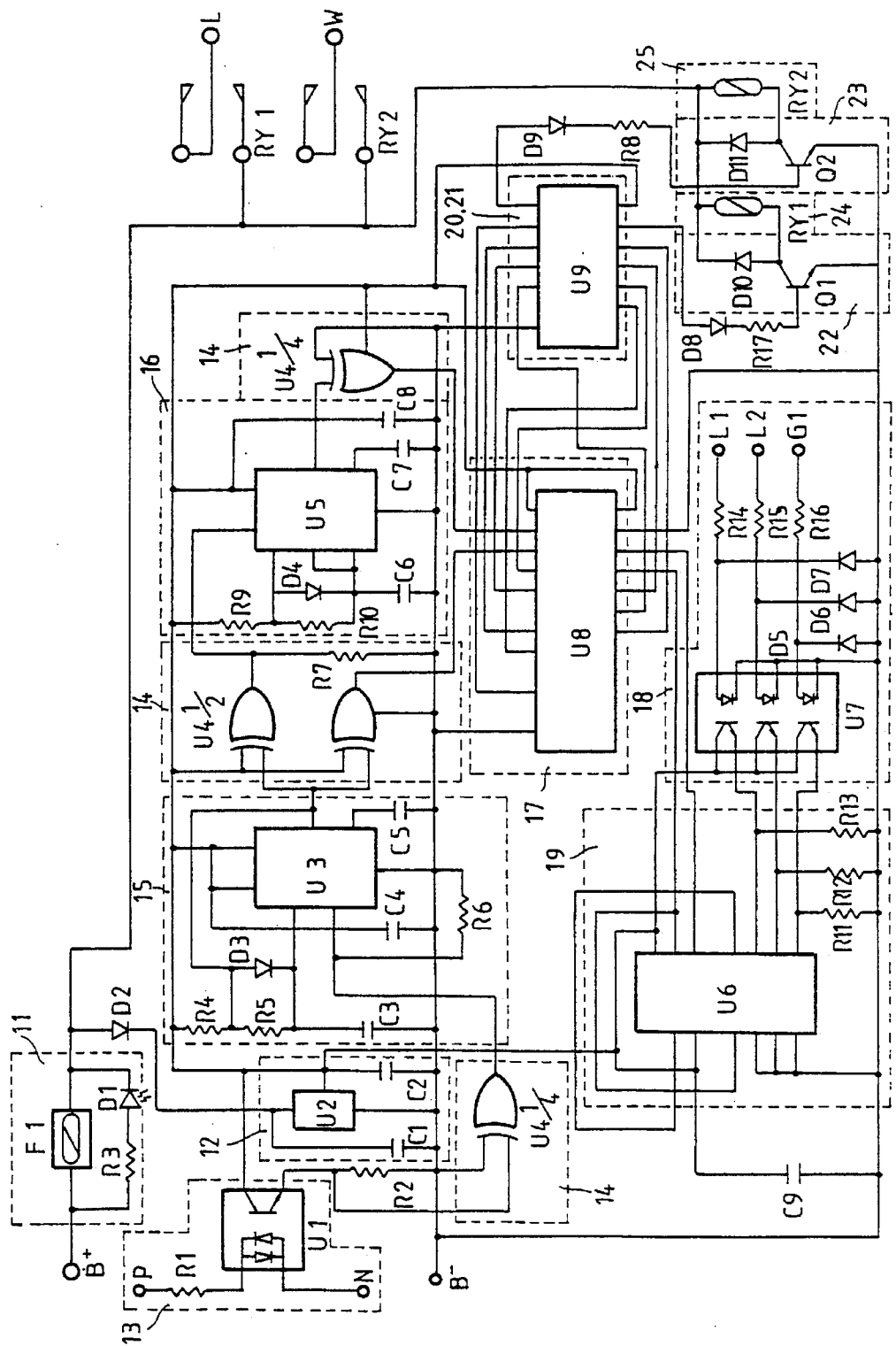
FIG. 2 is an electrical circuit of the present invention.

Referring to FIG. 2, there is shown an electrical circuit of the present invention. As illustrated, the power supplied from the battery of the motor vehicle is connected with the terminals B+ and B−. A temperature detecting unit including a resistor 3, a photo-diode D1 and a temperature controlling element F1 is connected with the terminal B+ so that when the power supply is short-circuited, the photo-diode D1 will give light thereby providing a warning signal. A voltage regulating unit U2 is connected with the terminal B− to keep the voltage at a predetermined value. A photocoupler U1 is connected with the voltage regulating unit U2. The voltage signal from the horn is picked up by the photocoupler U1 and then transmitted to the gate-controlled unit 14 to trigger the astable multivibrator 15 composed of counter U3, resistor 4, resistor 5, and capacitor C4. Hence, the astable multivibrator 15 will output a voltage signal at a predetermined time to trigger the monostable multivibrator 16 composed of counter U5, resistor R9, resistor R10, and capacitor C6 and input signal to an encoding input terminal of the decoder U8. In the meantime, the monostable multivibrator 16 will produce continuous time sequencing pulses which will be transmitted to another encoding input terminal of the decoder U8 via the gate-controlled unit U4.

The terminals L1, L2 and G1 of the headlight of a motor vehicle are connected with a photocoupler U7 which is in turn connected with the analog selective unit U6 for converting different line voltages into a uniform signal voltage which is then input to the encoding input terminal of the decoder U8.

When the horn is pressed, the decoder U8 will trigger the gate-controlled unit U9 to produce two voltage signals which will be amplified by transistors Q1 and Q2 for actuating relays RY1 and RY2 connected with the low beam and high beam, thereby making the low beam and the high beam to give light alternately.

As illustrated in FIG. 3, when the high beam is turned on and the horn is pressed, the high beam will be turned off and the low beam will be turned on. Likewise, when the low beam is turned on and the horn is pressed, the low beam will be turned off and the high beam will be turned on. In case the horn is continuously pressed, the high beam and the low beam will be alternately turned on thereby giving flashing light.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A warning device for logically controlling headlights of a motor vehicle comprising a photocoupler which picks up a first signal voltage from a circuitry from a horn and triggers an astable multivibrator via a gate-controlled circuit to output a second signal voltage in a predetermined time to a monostable multivibrator which outputs a continuous time-sequencing pulses to an encoding input of a decoder via the gate-controlled circuit thereby causing said decoder to produce a sequential output, said sequential output being divided by a multi-input gate-controlled circuit into two output voltages which are amplified by transistors to drive two relays connected with high beam light and low beam light thus making the high beam light and the low beam light to give light alternately.

2. The warning device for logically controlled headlights of a motor vehicle as claimed in claim 1, wherein a voltage input end of said headlights is converted by a photocoupler and suitably selected by a selective and distribution circuit to a single voltage signal which is transmitted to an encoding input terminal of a decoder, thereby producing logic encoding to automatically detect whether the high beam light or the low beam light is turned on thus making the high beam light and the low beam light to give light alternately.

3. The warning device for logically controlled headlights of a motor vehicle as claimed in claim 1, wherein the voltage input terminal of the high beam light is selected by a selective and distribution circuit so as to keep the high beam light and the low beam light to work normally.

4. The warning device for logically controlled headlights of a motor vehicle as claimed in claim 1, wherein the gate-controlled circuit connected with the decoder includes two sets thereby enabling the sequential output signal of the decoder to be converted into outputs with different voltages.

5. The warning device for logically controlled headlights of a motor vehicle as claimed in claim 1, wherein a power input terminal of said warning device is connected with a temperature controlling element which is connected with a resistor and a light-emitting diode whereby the light-emitting diode will give light in case of short circuit.

* * * * *